(12) United States Patent
Jana et al.

(10) Patent No.: US 12,169,650 B1
(45) Date of Patent: Dec. 17, 2024

(54) SYSTEM AND METHOD FOR MULTIPLEXING MULTI-DRIVE PASSTHROUGH COMMANDS

(71) Applicant: Avago Technologies International Sales Pte. Limited, Singapore (SG)

(72) Inventors: Arun Prakash Jana, Bangalore (IN); Amar Deep Kumar, Bangalore (IN)

(73) Assignee: Avago Technologies International Sales Pte. Limited, Singapore (SG)

( * ) Notice: Subject to any disclaimer, the term of this patent is extended or adjusted under 35 U.S.C. 154(b) by 0 days.

(21) Appl. No.: 18/361,661

(22) Filed: Jul. 28, 2023

(51) Int. Cl.
*G06F 3/06* (2006.01)
(52) U.S. Cl.
CPC .......... *G06F 3/0659* (2013.01); *G06F 3/0604* (2013.01); *G06F 3/0656* (2013.01); *G06F 3/0689* (2013.01)
(58) Field of Classification Search
CPC .... G06F 3/0604; G06F 3/0656; G06F 3/0659; G06F 3/0689
See application file for complete search history.

(56) References Cited

U.S. PATENT DOCUMENTS

2019/0155521 A1\* 5/2019 Bahirat ................ G06F 3/0619
2022/0405221 A1\* 12/2022 Wang ..................... G06N 3/063

\* cited by examiner

*Primary Examiner* — Khoa D Doan
*Assistant Examiner* — Julian S Mendel
(74) *Attorney, Agent, or Firm* — Foley & Lardner LLP

(57) ABSTRACT

A system may include one or more processors configured to receive a frame comprising a quantity of commands, a quantity of storage devices, and a buffer map. In response to the frame, the one or more processors may read, using the buffer map and from a memory, (1) input data for each of one or more storage devices corresponding to the quantity of storage devices and (2) an identifier of each of the one or more storage devices. The one or more processors may send, to the one or more storage devices, a plurality of commands corresponding to the quantity of commands, based at least on the input data for each storage device and the identifier of each storage device.

20 Claims, 6 Drawing Sheets

300

SYSTEM AND METHOD FOR MULTIPLEXING MULTI-DRIVE PASSTHROUGH COMMANDS

FIELD OF THE DISCLOSURE

This disclosure generally relates to systems and methods for applications to access one or more storage devices, and more particularly to embedding multiple commands into one command to execute the multiple commands simultaneously on one or more storage devices.

BACKGROUND

Application programs on a host computer can access storage devices (e.g., small computer system interface (SCSI) devices, parallel advanced technology attachment (PATA) devices, one or more serial advanced technology attachment (SATA) devices, one or more serial attached SCSI (SAS) devices, one or more peripheral component interconnect express (PCIe) devices, one or more non-volatile memory express (NVMe) devices) using passthrough (PT) commands (e.g., SCSI PT commands, SATA PT commands, SAS PT commands, PCIe PT commands) via a PT interface (e.g., SCSI PT interface, SATA PT interface, SAS PT interface, PCIe PT interface). When using PT commands, one management PT command (e.g., redundant array of independent disks (RAID) management PT command) can be used to issue only one PT command to one storage device (e.g., SCSI device, PATA device, STA device, SAS device, PCIe device, NVMe device) at a time. Since the host driver allocates only a single host buffer for an application to issue PT commands, there may be a restriction to allow only one SCSI PT command at a time. Due to the limitation of allowing only one SCSI PT command to only one of storage devices at a time, bulk operations on storage devices need to be serialized. Such serialized bulk operations may have a serious impact on performance as there is no parallelism.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

Figure 1A:
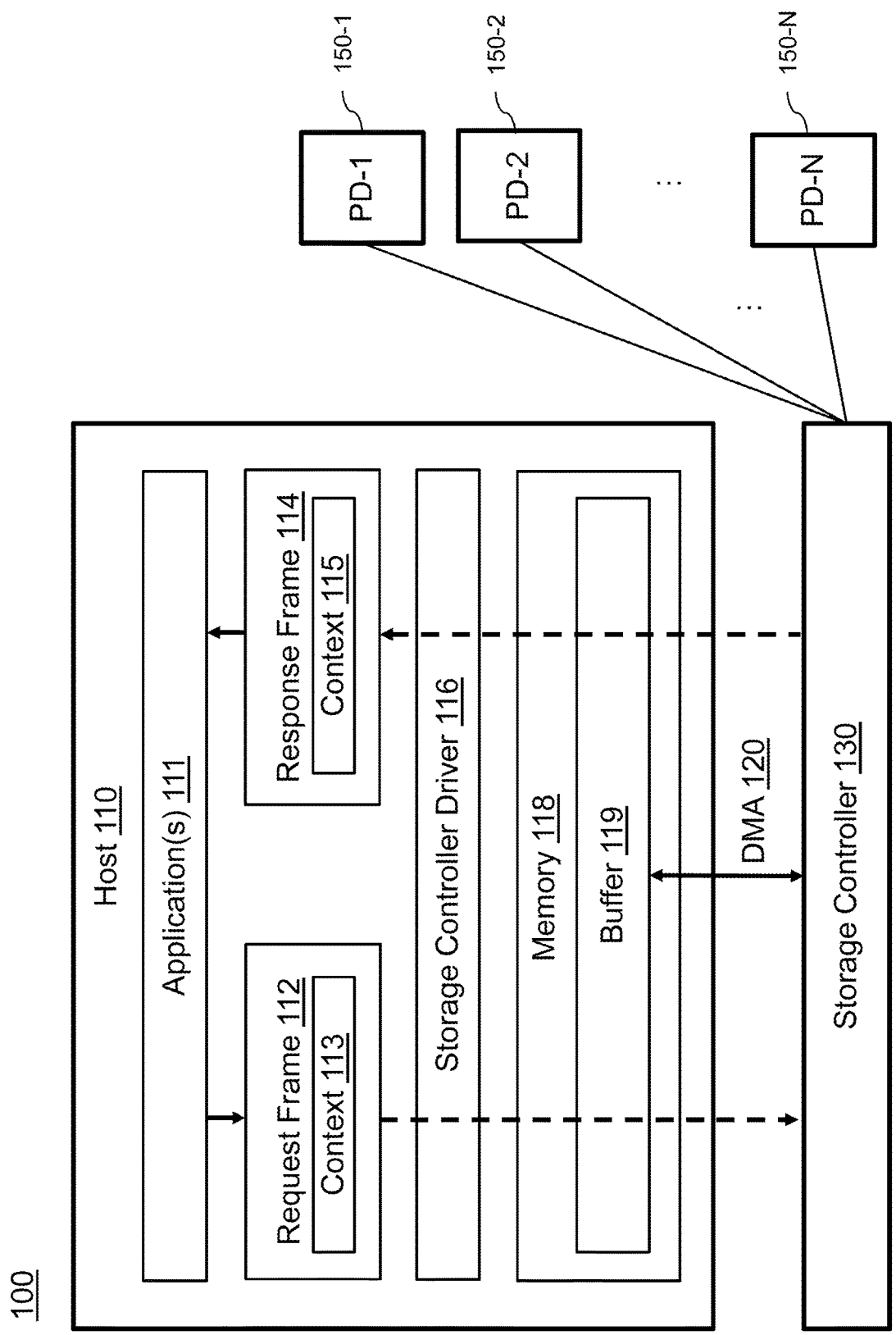
FIG. 1A is a schematic block diagram of a system including an example storage device configuration, in accordance with an embodiment.

The details of various embodiments of the methods and systems are set forth in the accompanying drawings and the description below.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. For example, a first feature in communication with or communicatively coupled to a second feature in the description that follows may include embodiments in which the first feature is in direct communication with or directly coupled to the second feature and may also include embodiments in which additional features may intervene between the first and second features, such that the first feature is in indirect communication with or indirectly coupled to the second feature. In addition, the present disclosure may repeat reference numerals and/or letters in the various examples. This repetition is for the purpose of simplicity and clarity and does not in itself dictate a relationship between the various embodiments and/or configurations discussed.

Various embodiments disclosed herein are related to a system including one or more processors configured to receive a frame comprising a quantity of commands (e.g., number of commands), a quantity of storage devices (e.g., number of storage devices), and a buffer map. In some embodiments, the frame may be a container for a network packet, a data block for transmission, a digital data transmission unit, or any data transmission unit in computer networking. In response to the frame, the one or more processors may be configured to read, using the buffer map and from a memory, (1) input data for each of one or more storage devices corresponding to the number of storage devices and (2) an identifier of each of the one or more storage devices. In some embodiments, the memory may be volatile memory (e.g., RAM), non-volatile memory, media and memory devices, semiconductor memory devices (e.g., SDRAM, and flash memory devices), magnetic disks, magneto optical disks, or any device with fixed storage or a device for reading removable storage media, or any other system, device, or component that stores electronic data for use by a computer. In some embodiments, the identifier of each of the one or more storage devices may be a serial number, a device unique ID (DUID), a network address (e.g., IP address, MAC address), a combination of vendor identifier, product identifier, and/or version identifier or any value or characters that can uniquely identify each storage device among the one or more storage device. The one or more processors may be configured to send, to the one or more storage devices, a plurality of commands corresponding to the number of commands, based at least on the input data for each storage device and the identifier of each storage device. In some embodiments, the storage device may be one or more volatile memory devices, one or more non-volatile memory devices, one or more magnetic disks, one or more magneto optical disks, one or more hard disk drives (HDD), one or more solid-state-drives (SSDs), redundant array of independent disks (RAID), or any physical device suitable for storing computer readable data. In some embodiments, the input data for a storage device may be any data that is used to execute a command in the storage device.

In some embodiments, the memory may include a plurality of buffers. A buffer map may identify a location and a length of each of the plurality of buffers. The plurality of commands may be stored in a first buffer of the plurality of buffers in an execution order. The one or more processors may be configured to read, from the first buffer, the plurality of commands and send, to the one or more storage devices, the plurality of commands in the execution order. In some embodiments, the buffer may be any temporary area where data is stored in a memory or a storage device.

In some embodiments, the identifiers of the one or more storage devices may be stored in a second buffer of the plurality of buffers. The input data for the one or more storage devices may be stored in a third buffer of the plurality of buffers. In some embodiments, the order in which the identifiers of the one or more storage devices are stored in the second buffer may be the same as the order in which the input data for the one or more storage devices are stored in the third buffer. Input and output buffers may be different for each command and there can be a plurality of input buffers and a plurality of output buffers. The plurality of input buffers and the plurality of output buffers can be arranged in the memory in any order.

In some embodiments, in sending the plurality of commands, the one or more processors may be configured to send, to the one or more storage devices, a first command of the plurality of commands. In response to sending the first command, the one or more processors may be configured to send, to the one or more storage devices, a second command of the plurality of commands without waiting for completion of executing the first command on the one or more storage devices. In some embodiments, the commands may be executed one after another on a specific storage device. However, the command can be executed on a specific storage device without waiting for completion of that command from other storage devices (e.g., the storage devices other than the specific storage device among the one or more storage devices). In some embodiments, a bit in a mailbox may be used to indicate that all commands can execute in parallel so that the commands may be executed in parallel (even on the same storage device).

In some embodiments, the one or more storage devices may form a redundant array of RAID device. In some embodiments, a RAID device may include one or more storage devices (as defined above) or disks forming, defining, or functioning as RAID, or a controller configured to control the physical devices or disks, or any device that can provide RAID structure or functions or services to users. In some embodiments, the plurality of commands may be small computer system interface (SCSI) passthrough commands and may be sent as frames according to a message passing interface (MPI). In some embodiments, the plurality of commands may include one or more SCSI commands, one or more PATA commands, one or more SATA commands, one or more PCIe commands, one or more NVMe commands, one or more HDD commands, one or more SDD commands, or any commands or instructions that can be sent to any physical device suitable for storing computer readable data.

Various embodiments disclosed herein are related to a device including a memory and a controller coupled to a plurality of storage devices. The controller may be configured to receive a frame comprising a quantity of commands (e.g., number of commands), a quantity of storage devices (e.g., number of storage devices) among the plurality of storage devices, and a buffer map. In response to the frame, the controller may be configured to read, using the buffer map and from the memory, (1) input data for each of one or more storage devices corresponding to the number of storage devices and (2) an identifier of each of the one or more storage devices. The controller may be configured to send, to the one or more storage devices, a plurality of commands corresponding to the number of commands, based at least on the input data for each storage device and the identifier of each storage device.

In some embodiments, the memory may include a plurality of buffers, and the buffer map may identify a location and a length of each of the plurality of buffers. The plurality of commands may be stored in a first buffer of the plurality of buffers in an execution order. The controller may be configured to read, from the first buffer, the plurality of commands. The controller may be configured to send, to the one or more storage devices, the plurality of commands in the execution order.

In some embodiments, the identifiers of the one or more storage devices may be stored in a second buffer of the plurality of buffers. The input data for the one or more storage devices may be stored in a third buffer of the plurality of buffers.

In some embodiments, in sending the plurality of commands, the controller may be configured to send, to the one or more storage devices, a first command of the plurality of commands. In response to sending the first command, the controller may be configured to send, to the one or more storage devices, a second command of the plurality of commands without waiting for completion of executing the first command on the one or more storage devices.

In some embodiments, the one or more storage devices may form a RAID device. In some embodiments, the plurality of commands may be SCSI passthrough commands and may be sent as frames according to an MPI.

Various embodiments disclosed herein are related to a method. The method may include receiving, by one or more processors, a frame comprising a quantity of commands (e.g., number of commands), a quantity of storage devices (e.g., number of storage devices), and a buffer map. The method may include in response to the frame, reading, by the one or more processors, using the buffer map and from a memory, (1) input data for each of one or more storage devices corresponding to the number of storage devices and (2) an identifier of each of the one or more storage devices. The method may include sending, by the one or more processors to the one or more storage devices, a plurality of commands corresponding to the number of commands, based at least on the input data for each storage device and the identifier of each storage device.

In some embodiments, the memory may include a plurality of buffers, and the buffer map may identify a location and a length of each of the plurality of buffers. The plurality of commands may be stored in a first buffer of the plurality of buffers in an execution order. The one or more processors may read, from the first buffer, the plurality of commands and sending, to the one or more storage devices, the plurality of commands in the execution order.

In some embodiments, the identifiers of the one or more storage devices may be stored in a second buffer of the plurality of buffers. The input data for the one or more storage devices may be stored in a third buffer of the plurality of buffers.

In some embodiments, in sending the plurality of commands, the one or more processors may send, to the one or more storage devices, a first command of the plurality of commands. In response to sending the first command, the one or more processors may send, to the one or more storage devices, a second command of the plurality of commands without waiting for completion of executing the first command on the one or more storage devices. In some embodiments, the one or more storage devices may form a RAID device.

Figure 1B:
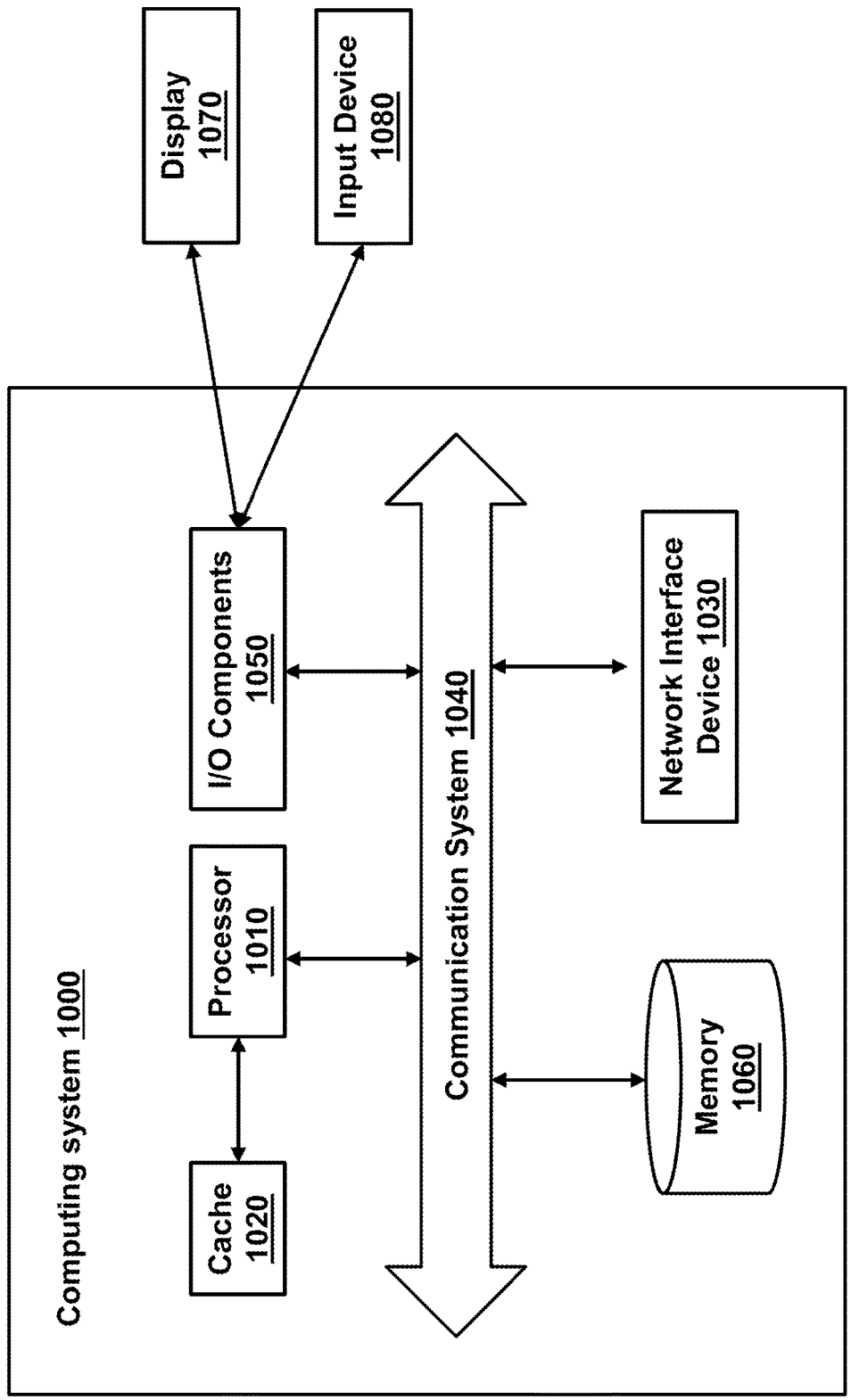
FIG. 1B is a schematic block diagram of a computing system, according to an embodiment.

FIG. 1A and FIG. 1B show an example configuration of a storage system (e.g., RAID system). FIG. 1A is a schematic block diagram of a system 100 including a host 110, a storage controller 130 (e.g., RAID controller), and a plurality of physical (storage) devices (PD-1, . . . , PD-N) 150-1, . . . , 150-N. For example, the storage controller 130 may control or support thousands of PDs 150. Each of the host 110, the storage controller 130 and the PDs 150 may have a configuration similar to that of a computing system in FIG. 1B, though each of the host 110, the storage controller 130 and the PDs 150 need not have all the components described with regard to FIG. 1B. In some embodiments, each physical device may be one or more volatile memory devices, one or more non-volatile memory devices, one or more magnetic disks, one or more magneto optical disks, one or more HDDs, one or more SSDs, RAID, or any physical device suitable for storing computer readable data.

The host 110 may include a memory 118, one or more applications 111 and a storage controller driver (or host driver) 116. Each of the one or more applications 111 and the host driver 116 may be implemented in hardware, software, firmware, or any combination thereof. The one or more applications 122 can send commands to the physical devices (PDs) 150-1, . . . 150-N via the host driver 116 and the storage controller 130 using communications between processes running on one or more processors (e.g., CPUs). In some embodiments, the one or more applications 122 can send commands to the PDs according to a message passing interface (MPI) standard (e.g., MPI 3.0). In some embodiments, the MPI may include any type and form of interface for communicating messages between computer processes, such as for example communicating messages among processes of a host application, a storage controller, and/or PDs, according to any MPI standards and any version thereof.

In some embodiments, the commands may be SCSI passthrough (PT) commands, and the applications 111 can send SCSI PT commands (e.g., RAID management PT commands) to the PDs 150 on the storage controller 130 through an MPI administrative request queue. The SCSI PT commands may be provided as a SCSI passthrough interface so that the applications 111 can access SCSI devices using SCSI PT commands. During a host-driver negotiation, the host driver 116 may allocate one or more host buffers 119 (e.g., a single buffer of 1 MB size) in the memory 118 to transfer input, data and status between the applications 111 and the storage controller 130. In some embodiments, the memory 118 may be a direct memory access (DMA)-capable memory, so that DMA is used to transfer data between the memory 118 and a local memory of the storage controller 130 using the host buffer 119.

In some embodiments, the storage controller 130 may receive the commands (e.g., RAID Management PT commands) sent as request frames 112 (e.g., MPI 3.0 request frames) from the applications 111. A request frame 112 for sending a command (e.g., PT command) may have a command scatter gather list (SGL) and a response SGL. A context 113 (e.g., PT context) carrying information of the command may be stored in the command SGL and may be transferred via DMA 120 to a local buffer of the storage controller 130. For example, the local buffer may be a local message index (LMID) context for storing LMID operation-specific data. If the PT command is of type DCMD (data command or direct command), the context 113 may store information of a DCMD command. The DCMD command may be a contract between an application (e.g., application 111) and a storage controller (e.g., controller 130) to (1) send management commands (along with parameters and/or input data) from the application to the storage controller and (2) receive status and data back. For example, the application 111 can download a disk image from the PDs 150 using DCMD commands. The DCMD input or output data may be transferred through one or more buffers carved out from the host buffer 119. Data transfer to or from these buffers can use DMA 120. Details of the layout of the request frame and buffers will be described below with reference to FIG. 2.

In some embodiments, in response to receiving the request frame 112 carrying the command, the storage controller 130 may send the command to a PD so that the PD can execute the command and return an execution result back to the storage controller 130. In response to receiving the execution result, the storage controller 130 may send the execution result as a response frame 114 (e.g., MPI 3.0 response frames) to the applications 111. The response frame 114 may have a layout or format similar to that of the request frame 112. For example, a context 115 (e.g., PT context) carrying information of the execution may be stored in a response SGL of the response frame and may be transferred via DMA 120 from a local buffer of the storage controller 130 to one or more buffers carved out from the host buffer 119.

FIG. 1B is a schematic block diagram of a computing system, according to an embodiment. An illustrated example computing system 1000 includes one or more processors 1010 in communication, via a communication system 1040 (e.g., bus), with memory 1060, at least one network interface controller 1030 with network interface port for connection to a network (not shown), and other components, e.g., input/output ("I/O") components 1050. Generally, the processor(s) 1010 will execute instructions (or computer programs) received from memory. The processor(s) 1010 illustrated incorporate, or are directly connected to, cache memory 1020. In some instances, instructions are read from memory 106 into cache memory 1020 and executed by the processor(s) 1010 from cache memory 1020. The computing system 1000 may not necessarily contain all of these components shown in FIG. 1B, and may contain other components that are not shown in FIG. 1B.

In more detail, the processor(s) 1010 may be any logic circuitry that processes instructions, e.g., instructions fetched from the memory 1060 or cache 1020. In many implementations, the processor(s) 1010 are microprocessor units or special purpose processors. The computing device 1050 may be based on any processor, or set of processors, capable of operating as described herein. The processor(s) 1010 may be single core or multi-core processor(s). The processor(s) 1010 may be multiple distinct processors.

The memory 1060 may be any device suitable for storing computer readable data. The memory 1060 may be a device with fixed storage or a device for reading removable storage media. Examples include all forms of volatile memory (e.g., RAM), non-volatile memory, media and memory devices, semiconductor memory devices (e.g., EPROM, EEPROM, SDRAM, and flash memory devices), magnetic disks, magneto optical disks, and optical discs (e.g., CD ROM, DVD-ROM, or Blu-Ray® discs). A computing system 1000 may have any number of memory devices 1060.

The cache memory 1020 is generally a form of computer memory placed in close proximity to the processor(s) 1010 for fast read times. In some implementations, the cache memory 1020 is part of, or on the same chip as, the processor(s) 1010. In some implementations, there are multiple levels of cache 1020, e.g., L2 and L3 cache layers.

The network interface controller 1030 manages data exchanges via the network interface (sometimes referred to as network interface ports). The network interface controller 1030 handles the physical and data link layers of the OSI model for network communication. In some implementations, some of the network interface controller's tasks are handled by one or more of the processor(s) 1010. In some implementations, the network interface controller 1030 is part of a processor 1010. In some implementations, the computing system 1000 has multiple network interfaces controlled by a single controller 1030. In some implementations, the computing system 105 has multiple network interface controllers 1030. In some implementations, each network interface is a connection point for a physical network link (e.g., a cat-5 Ethernet link). In some implementations, the network interface controller 1030 supports wireless network connections and an interface port is a wireless (e.g., radio) receiver or transmitter (e.g., for any of the IEEE 802.11 protocols, near field communication "NFC", Bluetooth, ANT, or any other wireless protocol). In some implementations, the network interface controller 1030 implements one or more network protocols such as Ethernet. Generally, a computing device 1050 exchanges data with other computing devices via physical or wireless links through a network interface. The network interface may link directly to another device or to another device via an intermediary device, e.g., a network device such as a hub, a bridge, a switch, or a router, connecting the computing device 1000 to a data network such as the Internet.

The computing system 1000 may include, or provide interfaces for, one or more input or output ("I/O") devices. Input devices include, without limitation, keyboards, microphones, touch screens, foot pedals, sensors, MIDI devices, and pointing devices such as a mouse or trackball. Output devices include, without limitation, video displays, speakers, refreshable Braille terminal, lights, MIDI devices, and 2-D or 3-D printers.

Other components may include an I/O interface, external serial device ports, and any additional co-processors. For example, a computing system 1000 may include an interface (e.g., a universal serial bus (USB) interface) for connecting input devices, output devices, or additional memory devices (e.g., portable flash drive or external media drive). In some implementations, a computing device 1000 includes an additional device such as a co-processor, e.g., a math co-processor can assist the processor 1010 with high precision or complex calculations.

The components 1090 may be configured to connect with external media, a display 1070, an input device 1080 or any other components in the computing system 1000, or combinations thereof. The display 1070 may be a liquid crystal display (LCD), an organic light emitting diode (OLED), a flat panel display, a solid state display, a cathode ray tube (CRT), a projector, a printer or other now known or later developed display device for outputting determined information. The display 1070 may act as an interface for the user to see the functioning of the processor(s) 1010, or specifically as an interface with the software stored in the memory 1060.

The input device 1080 may be configured to allow a user to interact with any of the components of the computing system 1000. The input device 1080 may be a plurality pad, a keyboard, a cursor control device, such as a mouse, or a joystick. Also, the input device 1080 may be a remote control, touchscreen display (which may be a combination of the display 1070 and the input device 1080), or any other device operative to interact with the computing system 1000, such as any device operative to act as an interface between a user and the computing system 1000.

Figure 2:
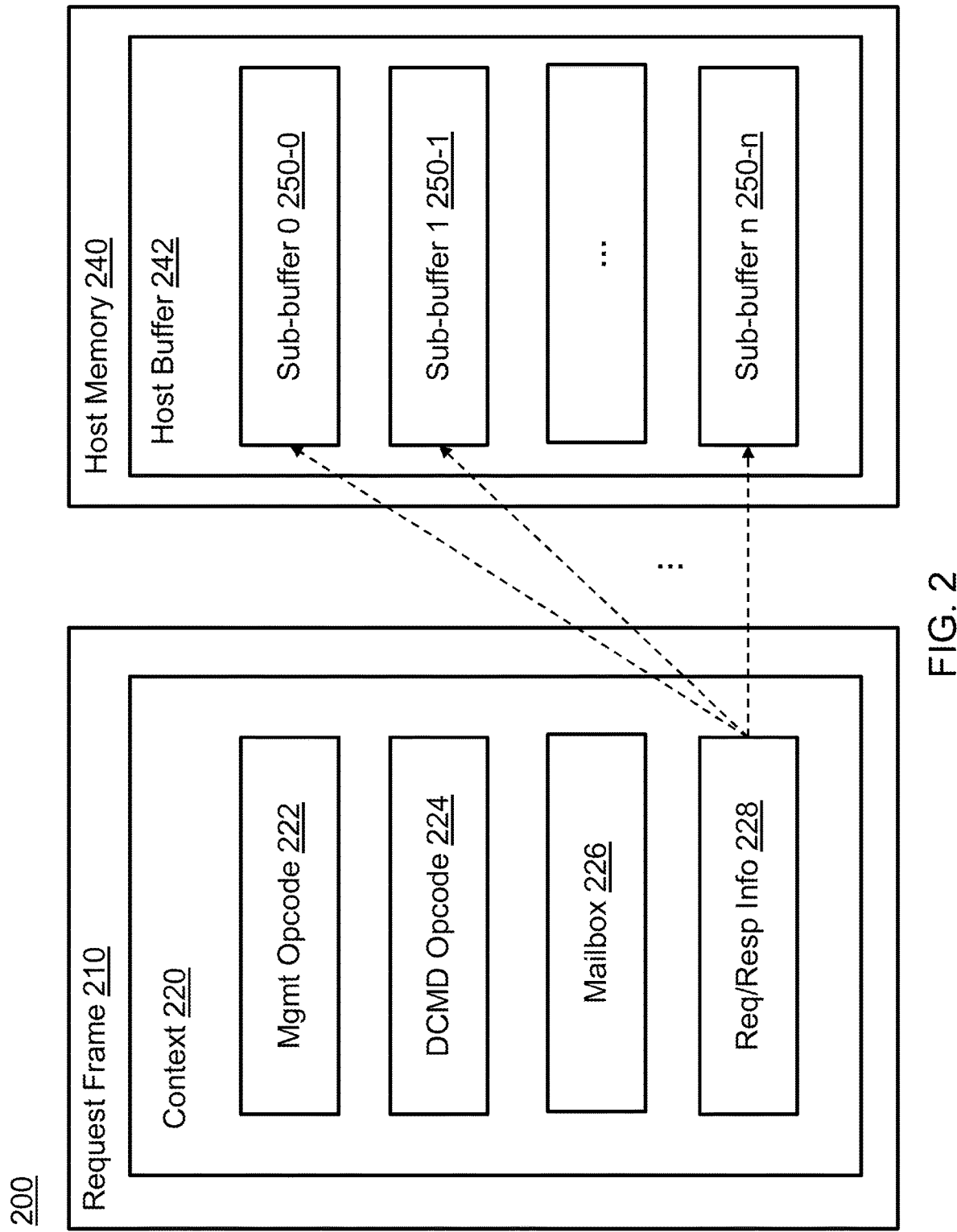
FIG. 2 is a schematic block diagram of a layout of a frame and a memory for executing a command in a storage device, in accordance with an embodiment.

FIG. 2 is a schematic block diagram of a layout 200 of a frame (e.g., request frame 210 carrying a DCMD command) and a memory (e.g., host memory 240) for executing a command in a storage device, in accordance with an embodiment. Referring to FIG. 2, a DCMD command may be embedded, included, identified, specified, or contained within a context 220 (e.g., RAID management PT context) of a request frame (e.g., MPI 3.0 request frame). In one implementation, the context 220 for the DCMD command may include the fields of management opcode 222 (e.g., management PT opcode), DCMD opcode 224, mailbox 226, and/or request or response information 228. The management opcode field 222 may contain a management opcode type (e.g., "DCMD" type in the current context). The DCMD opcode field 224 may contain a DCMD opcode which is a numeric value to identify the DCMD command. The mailbox field 226 may a buffer to pass data along with the DCMD opcode. In some embodiments, the mailbox field 226 may be a buffer of size 32 bytes which is sent along with the DCMD command to a storage controller (e.g., storage controller 130) in the PT context 220. Since the mailbox field is limited in size, the mailbox may be used to pass only informative bits and bytes, for example, a PD identifier, generic indicators, etc. The generic indicators may be flags relevant to the DCMD, for example, a flag to discard the cache before deleting an LD (if the DCMD is to delete the LD).

The request or response information field 228 may contain DCMD information (e.g., command SGL and/or a response SGL), and buffer information. In some embodiments, the buffer information may include a number of sub-buffers of a host buffer in a host memory (e.g., sub-buffers 250-1, . . . , 250-*n* of a host buffer 242 in a memory 240), offset and length of each sub-buffer (or any location information of the sub-buffers), and a buffer number or identifier of each sub-buffer. In some embodiments, the buffer information may be represented by a SGL, and contain information (e.g., offset and length of each sub-buffer) pointing or linking to (or locating) n sub-buffers 250-1, . . . , 250-*n* in the memory 240. In some embodiments, the sub-buffers 250-1, . . . 250-*n* may be uni-directional or bi-directional DMA-able sub-buffers carved out from a single host buffer (e.g., host buffer 119 in FIG. 1A). The sub-buffers 250-1, . . . , 250-*n* may be DCMD-specific sub-buffers with pre-defined offsets and lengths in the host buffer. The sub-buffers may be continuous in the memory but may not be contiguous in some embodiments. Each sub-buffer may be identified by a buffer number. In some embodiments, the sub-buffers can be variable-length even for the same DCMD command. In some embodiments, the total number of sub-buffers and buffer numbers may be predetermined or pre-defined for a management PT command. That is, the total number of sub-buffers and buffer numbers may be defined to be fixed per DCMD command because only one management PT command (e.g., RAID management PT command) is supported in one DCMD command. Using the sub-buffers, the host buffer can be utilized for bulk data transfer for the DCMD along with the DCMD opcodes and parameters which can be of variable count and size and are well-defined and understood by both the application and the storage controller.

In one aspect, applications (e.g., programs) on a host computer can access storage devices using PT commands via a PT interface. When using PT commands, one management PT command (e.g., RAID management PT command) can be used to issue only one PT command to one storage device (e.g., SCSI device) at a time. Since the host driver allocates only a single host buffer for an application to issue PT commands, there may be a restriction to allow only one SCSI PT command at a time. Alternatively, multiple SCSI PT commands can be used through an out-of-band (OOB) interface. However, the number of SCSI PT commands may also be limited by the number of buffers available for the OOB interface (typically 2). Due to the limitation of allowing only one SCSI PT command to only one of storage devices at a time, bulk operations on storage devices need to be serialized. Such serialized bulk operations may have a serious impact on performance as there is no parallelism. For example, even if the same SCSI PT command has to be issued to multiple PDs, the issuance to the multiple PDs cannot be achieved in parallel. Even for multiple PDs (e.g., n number of PDs) that have the same model and comparable speeds, issuing a command to the n number of PDs may take n times the duration taken to complete the command on one PD.

Moreover, a single slow command on a PD in a series of operations can delay the complete procedure. For example, assuming a system in which there are 2 PDs, a first command (command 1) may take 1 second on both PDs and a second command (command 2) may take 5 seconds on PD1 and 2 seconds on PD2. When executed sequentially, command 1 will take 2 (=1+1) seconds to complete on both the devices (e.g., drives) while command 2 will take 7 (=5+2) seconds to complete on both the devices, resulting in the total time taken 9 seconds. With thousands of PDs, this delay can add up to hours.

Furthermore, there is no way to issue multiple commands in parallel even if the cumulative bidirectional data transfer is performed within the host buffer size. The SCSI protocol does not support issuing a command to multiple endpoints simultaneously. Therefore, storage solutions also follow the same approach (e.g., serialized bulk operations) and do not achieve parallelism. Additionally, the host buffer is utilized sub-optimally in most cases as the data transfer involved in a single non-I/O SCSI command execution on a single PD is not significant compared to the host buffer size. Therefore, even if the host buffer size is increased, the space would be wasted while executing most of the SCSI PT commands.

To solve these problems, according to certain aspects, embodiments in the present disclosure relate to a technique to embed, combine or multiplex multiple storage commands (e.g., SCSI PT commands) in one command (e.g., one DCMD command or one management PT command) and issue the multiple storage commands to multiple PDs simultaneously. For example, 256 SCSI PT commands can be embedded, included, identified, specified, or contained in one DCMD command and can be issued or executed simultaneously. In some embodiments, a system for executing multiple commands in one or more storage devices can allow for both fixed and (optionally) dynamic amount of bidirectional data transfer for each PD while sending the command status (or execution status) for each PD back to the application simultaneously. Compared to techniques in which only one command (e.g., DCMD command) is supported and the command and total number of buffers (typically 1 for request data and 1 for response data) etc. are well-defined, in some embodiments, multiple commands can be issued together such that each command may use different numbers of buffers depending on the type of command. Thus, the total number of buffers and sub buffers (or segments) may vary.

In some embodiments, a command (e.g., a new type of DCMD command) for multiplexing multiple PT commands (e.g., SCSI PT commands) may be embedded, included, identified, specified, or contained within a context (e.g., RAID management PT context) of a request frame (e.g., MPI 3.0 request frame). The context for the new DCMD command may include the fields of (1) management opcode (e.g., management PT opcode), (2) a DCMD opcode indicating a new DCMD command (e.g., multiplexed DCMD), (3) mailbox, and/or (4) a buffer map. The management opcode field may contain a management opcode type (e.g., "DCMD" type). The DCMD opcode field may contain a new (or newly defined) DCMD opcode (e.g., a numeric value) indicating a type of multiplexed DCMD. The multiplexed DCMD command can support execution of multiple PT commands on one or more PDs simultaneously.

The mailbox field may be a buffer (e.g., 32 byte buffer denoted by mailbox [0 . . . 31]) to pass data along with the opcode (e.g. management opcode or DCMD opcode). The mailbox field may be mostly used to pass generic information such as information relating to checking a state of a PD before operation. In some embodiments, the mailbox field may contain (1) the number of commands, such as SCSI PT commands (that are embedded, included, identified, specified, or contained in the multiplexed DCMD command and can be simultaneously or concurrently issued or executed) and/or (2) the number of PDs (to which each command can be issued). In some embodiments, a byte or nibble in the mailbox can be used to indicate the number of SCSI PT commands in the frame. If conventional PT commands are used, the number of SCSI PT commands that can be executed in series may be limited because in most cases one SCSI PT command is issued by the application only after the status of the previous command is verified as successful. In contrast, in some embodiments, the storage controller can continue issuing the next command on behalf of the application unless the successful status check is required for the previous commands. In some embodiments, a byte in the mailbox (different from the byte or nibble used for the number of SCS PT commands) may be used to specify the number of PDs to which each SCSI PT command is to be issued.

The buffer map field, also referred to as the buffer map, may contain information on a plurality of buffers (denoted by buffer [0], buffer [1], . . . , buffer [n] of a host buffer in a host memory, where n is an integer greater than or equal to 1) in the memory (e.g., information for accessing the buffers). Details of the plurality of buffers and the buffer map field (or buffer map) will be described in the following sections.

In some embodiments, a plurality of buffers of a host buffer may be allocated, assigned or carved out from a host memory. The plurality of buffers may include one or more bidirectional buffers including both input data and output data for a PT command. Each buffer may be divided into a plurality of segments. Each segment may contain common data for all PDs or PD-specific data. The length of each segment (segment length) can be fixed or variable. In some embodiments, the plurality of buffers may include a segment length buffer to define or specify a fixed segment length or a variable segment length.

In some embodiments, the plurality of buffers may include a PT command buffer (e.g., SCSI PT command buffer). In some embodiments, m number of PT request frames (e.g., MPI 3.0 SCSI PT request frames) may be embedded, included, identified, specified, or contained into one buffer, e.g., the PT command buffer, where m is an integer greater than or equal to 1. Using the PT command buffer, a system for executing multiple PT commands (e.g., SCSI PT commands) can function like a multiplexer through which multiple SCSI PT commands can be sent from an application to a storage controller simultaneously. For example, each of the SCSI PT frames may be 128 bytes in length. In the PT command buffer, the SCSI PT frames may be packed one after another in the same order in which the application wants the storage controller to execute the commands. As the commands contained in the SCSI PT frames are to be executed on each of one or more devices (PDs), any device-specific fields of the SCSI PT frames (e.g., device handle field) which represent a particular single device (PD) may be marked as invalid.

In some embodiments, a PT command may have a command number defined by its position in the PT command buffer. For example, the PT command in the first position in the PT command buffer may be command No. 1, the PT command in the second position in the PT command buffer may be command No. 2, and so on. In some embodiments, a PT command can have up to 1 input buffer and 1 output buffer. A PT command can be linked to its corresponding input buffer and output buffer by linking the command number of the PT command to the buffer numbers of the corresponding input buffer and output buffer. In some embodiments, the buffer map can link (or have information linking) the command number of a PT command to the buffer numbers of an input buffer and an output buffer of the PT command.

In some embodiments, the plurality of buffers may include a device list buffer that lists all the PDs (e.g., listing PD identifiers of all the PDs) to which the SCSI PT commands are issued. The device list buffer can define or specify (1) the number of segments (units carrying data for each PD in the device list) in buffers which are not common for all PDs and (2) the order in which the segments for each PD are stored in a buffer. For example, if there are n devices in the device list, other buffers (with sub-buffers of fixed length) which carry information for PD-1, PD-2, . . . , and PD-n, can use (total buffer length/n) length of data for each of the PDs. In some embodiments, even if there is only one PD, the device list buffer may be used to implement a multiplexed DCMD.

In some embodiments, the plurality of buffers may include one or more segment length buffers to define or specify variable length segments (for corresponding PDs) in a buffer. A segment length buffer may contain or specify the length of each segment in a buffer (for the corresponding PD) in the same order as that of PDs listed in the device list buffer. All elements in the segment length buffer may be the same in length and represent corresponding PDs in the same order as that of PDs listed in the device list buffer. Like the other buffers, the segment length buffers may have buffer numbers.

Input data can be common for all PDs or PD-specific. In some embodiments, the plurality of buffers may include an input buffer to contain input data that is PD-specific. For example, if n bytes of data have to be sent for each PD and there are m PDs to which commands are issued, the input buffer may have m segments of n bytes each. The m segments may be arranged or positioned in same order as that of PDs listed in the device list buffer. For example, the input data for the first device listed in the device list buffer may be contained in the first segment of the input buffer, the input data for the second device listed in the device list buffer may be contained in the second segment of the input buffer, and so on. If no input data is used for the commands (e.g., DCMD commands), this buffer may be omitted or optional. A segment length buffer can be used to specify or define per-PD variable length segments of an input buffer.

In some embodiments, the plurality of buffers may include an output buffer which is used to return output data for each PD. For example, if n bytes of data have to be returned for each PD and there are m PDs to which commands are issued, the output buffer may have m segments of n bytes each. The m segments may be arranged or positioned in same order as that of PDs listed in the device list buffer. If no output data is expected from the PDs for the commands (e.g., DCMD commands), this buffer may be omitted or optional. A segment length buffer can be used to specify or define per-PD variable length segments of an output buffer.

In some embodiments, the plurality of buffers may include one or more buffers that may transfer both input and output data. In other words, the same buffer can be marked or used for both input and output and such buffers can be indicated as overlapping buffers or bidirectional buffers. After the storage controller issues a command to multiple PDs, data returned from the multiple PDs can be received at different times. Thus, the storage controller may DMA complete buffers into the local memory before initiating an operation (e.g., issuing the next command) on the first PD. For example, the storage controller can use individual DMAs to write data to an output buffer as and when the data are received from individual PDs instead of waiting for the output of all PDs. In some embodiments, each buffer may have a data direction-input (0), output (1), or bidirectional (2). In other words, each buffer can be indicated as an input buffer, an output buffer, or a bidirectional buffer by specifying a data direction of each buffer (in the buffer map, for example).

In some embodiments, the plurality of buffers may include a failed command number buffer that has an array of bytes or nibbles ordered by the device list order (e.g., the order of PDs listed in the device list buffer), each byte or nibble indicating the command number that has failed for the corresponding PD. It is possible that one command from the series of commands has failed for a PD, and the storage controller stops issuing the outstanding commands, if any, to the PD. In this case, to indicate to the application which command failed, the storage controller can set the command number in the element corresponding to the PD in the failed command number buffer. For example, if the second command fails for a PD that is listed in the third element of the device list buffer, the storage controller can set the corresponding element for the PD (i.e., third element of the failed command number buffer) to the corresponding command number (i.e., command number corresponding to the second command). If all the commands were successful, all the elements of the failed command number buffer may be set to a value of 0. If only one SCSI PT command is embedded, included, identified, specified, or contained, the failed command number buffer may be omitted or optional.

In some embodiments, the plurality of buffers may include a status buffer to indicate a status (e.g., execution status) of a command. The status of the command may indicate failure reasons or code of a failed command. For example, the status buffer may have an array of command execution statuses for each PD ordered by the device list order. In some embodiments, the status of the last command executed on each PD may be stored in the status buffer.

In some embodiments, the buffer map field may contain the total number of buffers used in the current DCMD command (e.g., (n+1) buffers whose buffer numbers are 0, 1, 2, ..., n), and buffer access information for accessing each of the plurality of buffers. For each buffer, the buffer access information may include a buffer number, an offset, a length, a segment length, a number of elements, and/or a data direction of that buffer. In some embodiments, a segment length of 0 may indicate a common buffer for all PDs (e.g. a buffer with a PD firmware image for all PDs listed in the device list buffer). Common buffers may be common for all PDs and have no sub-buffers. For example, PT command buffer and device list buffer may not be common buffers as both have sub-buffers (of fixed length).

In some embodiments, buffer number 0 may be reserved for a PT command buffer and buffer number 1 may be reserved for a device list buffer. For example, the buffer map may include buffer access information of the PT command buffer (e.g., a list of MPI3.0 SCSI PT request frames of 128 bytes each) having buffer number 0 (buffer [0]). The buffer map may include buffer access information of the device list buffer (e.g., an array of PD identifiers) having buffer number 1 (buffer [1]). The buffer map may include buffer access information of the failed command number buffer having buffer number (n-1), for example. The buffer map may include buffer access information of the status buffer having buffer number n, for example.

In some embodiments, the buffer map may contain mapping information. For example, the buffer map may specify mapping between a command number (of a command) and a buffer number of an input buffer (corresponding to the command). The buffer map may specify mapping between a command number (of a command) and a buffer number of an output buffer (corresponding to the command).

In some embodiments, the buffer map may contain information of one or more segment length buffers, for example, buffer number and usage of each segment length buffer. In some embodiments, if a segment length buffer is used for a particular buffer, the buffer access information of the particular buffer may include (1) a bit indicating that a segment length buffer is used, and (2) a buffer number of the segment length buffer to be used.

Embodiments in the present disclosure have at least the following advantages and benefits. First, embodiments in the present disclosure can provide useful techniques for issuing multiple commands (e.g., SCSI PT commands) simultaneously to multiple PDs in a multiplexed fashion. For example, a first command is issued to the multiple PDs, a second command is then issued to the multiple PDs, and so on. Hence, the time taken to complete a series of commands to multiple PDs with comparable performance can be equal to the time taken to complete a series of commands on one such PD. The PDs may not necessarily be of the same model. In some embodiments, multiple SCSI PT commands can be issued simultaneously as long as the cumulative data transfer in any direction is lesser than the size of a host buffer (e.g., host buffer including a plurality of buffers).

Second, embodiments in the present disclosure can provide useful techniques for executing commands in parallel on multiple PDs. For example, the same command can be executed on multiple PDs in parallel, or different commands can be executed on multiple PDs in parallel. As a result, a command may take the time taken by the slowest PD to complete. Assuming a system in which there are 2 PDs, a first command (command 1) may take 1 second on both PDs and a second command (command 2) may take 5 seconds on PD1 and 2 seconds on PD2. When executed sequentially, command 1 will take 2 (=1+1) seconds to complete on both the devices (e.g., drives) while command 2 will take 7 (=5+2) seconds to complete on both the devices, resulting in the total time taken 9 seconds. In contrast, if the commands are executed in parallel on both the PDs, command 1 may take 1 second to complete and command 2 may take 5 seconds (time taken to complete on slowest PD) to complete so the process can take 6 seconds to complete instead of 9 seconds when the commands are executed sequentially. In other words, as the number of commands increases, the time to complete the commands may not linearly increase.

Third, embodiments in the present disclosure can provide useful techniques for executing a command without waiting for completion of the previous command. In some embodiments, the storage controller may not need to wait for one command to complete on all PDs. The next command can be issued immediately on a PD when the previous command completes without waiting for any other command completions. In some embodiments, if multiple commands can be issued to the same PD, the multiple commands can be executed in parallel on the PD. For example, a bit in the mailbox can be used to indicate that all the comments in the SCSI PT command buffer can be issued in parallel to each PD in the device list buffer so that the multiple commands can be executed in parallel on each PD.

Fourth, embodiments in the present disclosure can provide useful techniques for optimally utilizing a host buffer. In some embodiments, even if a host buffer size increases, the host buffer can be optimally used because more SCSI PT commands and PDs can be accommodated in the host buffer. For example, increasing the host buffer size from 1 MB to 4 MB can significantly improve performance of per-PD sequential command executions (e.g., in case of executing commands such as PD firmware download, inquiry data fetch etc.)

Figure 3:
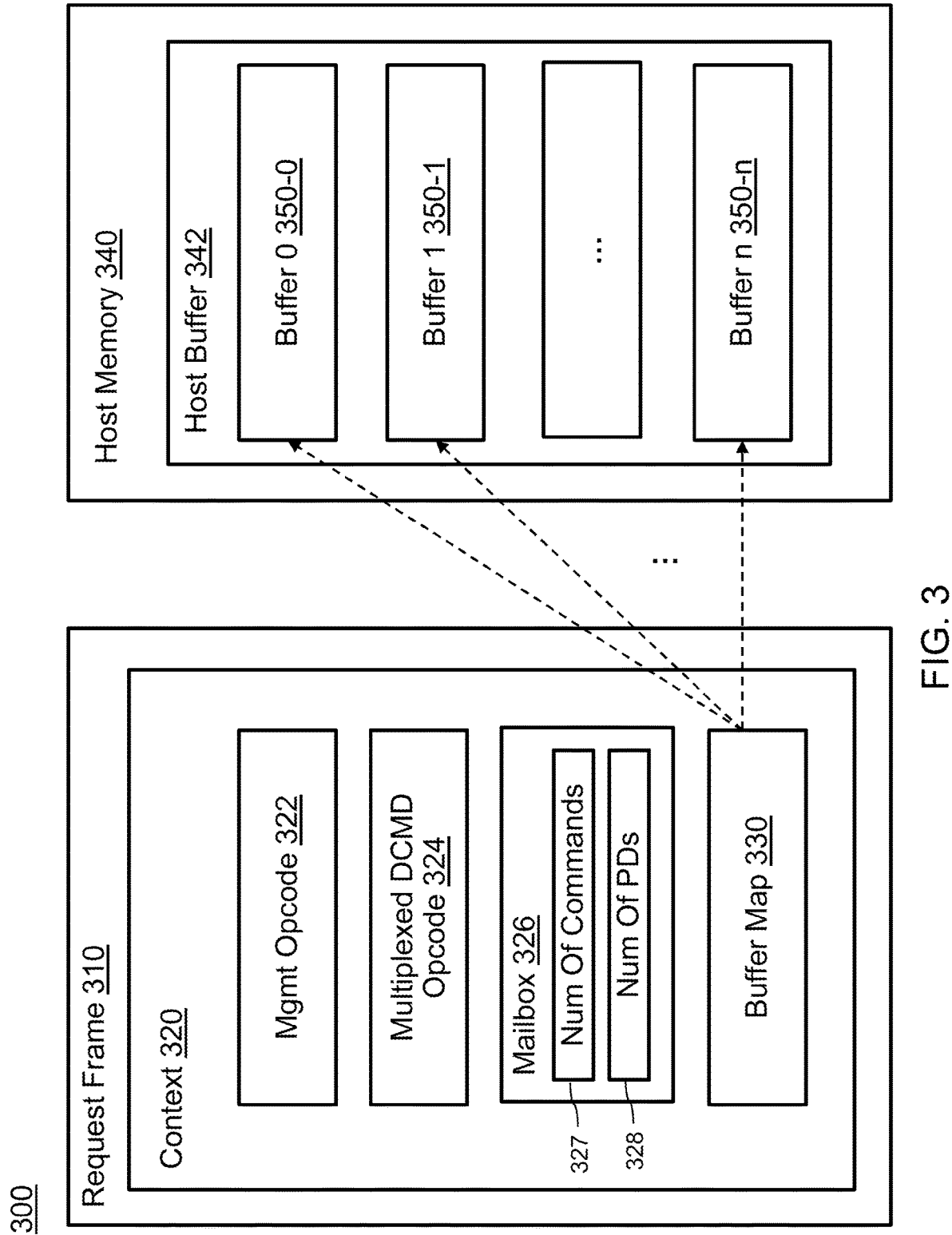
FIG. 3 is a schematic block diagram of a layout of a frame and a memory for executing multiple commands in one or more storage devices, in accordance with an embodiment.

FIG. 3 is a schematic block diagram of a layout 300 of a frame (e.g., request frame 310) and a memory (e.g., host memory 340) for executing multiple commands in one or more storage devices, in accordance with an embodiment. Referring to FIG. 3, a command (e.g., a new type of DCMD command) for multiplexing multiple PT commands (e.g., SCSI PT commands) may be embedded, included, identified, specified, or contained within a context 320 (e.g., RAID management PT context) of the request frame 310 (e.g., MPI 3.0 request frame). The context 320 for the new DCMD command may include the fields of (1) management opcode 322 (e.g., management PT opcode), (2) a DCMD opcode 324 indicating a new DCMD command (e.g., multiplexed DCMD), (3) mailbox 326, and/or (4) a buffer map 330. The management opcode field 322 may contain a management opcode type (e.g., "DCMD" type). The DCMD opcode field 324 may contain a new (or newly defined) DCMD opcode (e.g., a numeric value) indicating a type of multiplexed DCMD. The multiplexed DCMD command can support execution of multiple PT commands on one or more PDs simultaneously.

The mailbox field 326 may be a buffer (e.g., 32 byte buffer denoted by mailbox [0 ... 31]) to pass data along with the opcode (e.g. management opcode 322 and/or DCMD opcode 324). The mailbox field 326 may be mostly used to pass generic information such as information relating to checking a state of a PD before operation. In some embodiments, the mailbox field 326 may contain (1) the number of commands 327, such as SCSI PT commands (that are embedded, included, identified, specified, or contained in the multiplexed DCMD command and can be simultaneously or concurrently issued or executed) and/or (2) the number of PDs 328 (to which each SCSI PT command can be issued). A byte or nibble in the mailbox can be used to indicate the number of SCSI PT commands embedded, included, identified, specified, or contained. A byte in the mailbox (different from the byte or nibble used for the number of SCS PT commands) may be used to specify the number of PDs to which each SCSI PT command is to be issued.

The buffer map field 330 may contain information on a plurality of buffers (denoted by buffer [0] 350-0, buffer [1] 350-1, . . . , buffer [n] 350-n of a host buffer 342 in the host memory 340, where n is an integer greater than or equal to 1) in the memory (e.g., information for accessing the buffers). Details of the plurality of buffers and the buffer map field (or buffer map) will be described with reference to FIG. 4.

Figure 4:
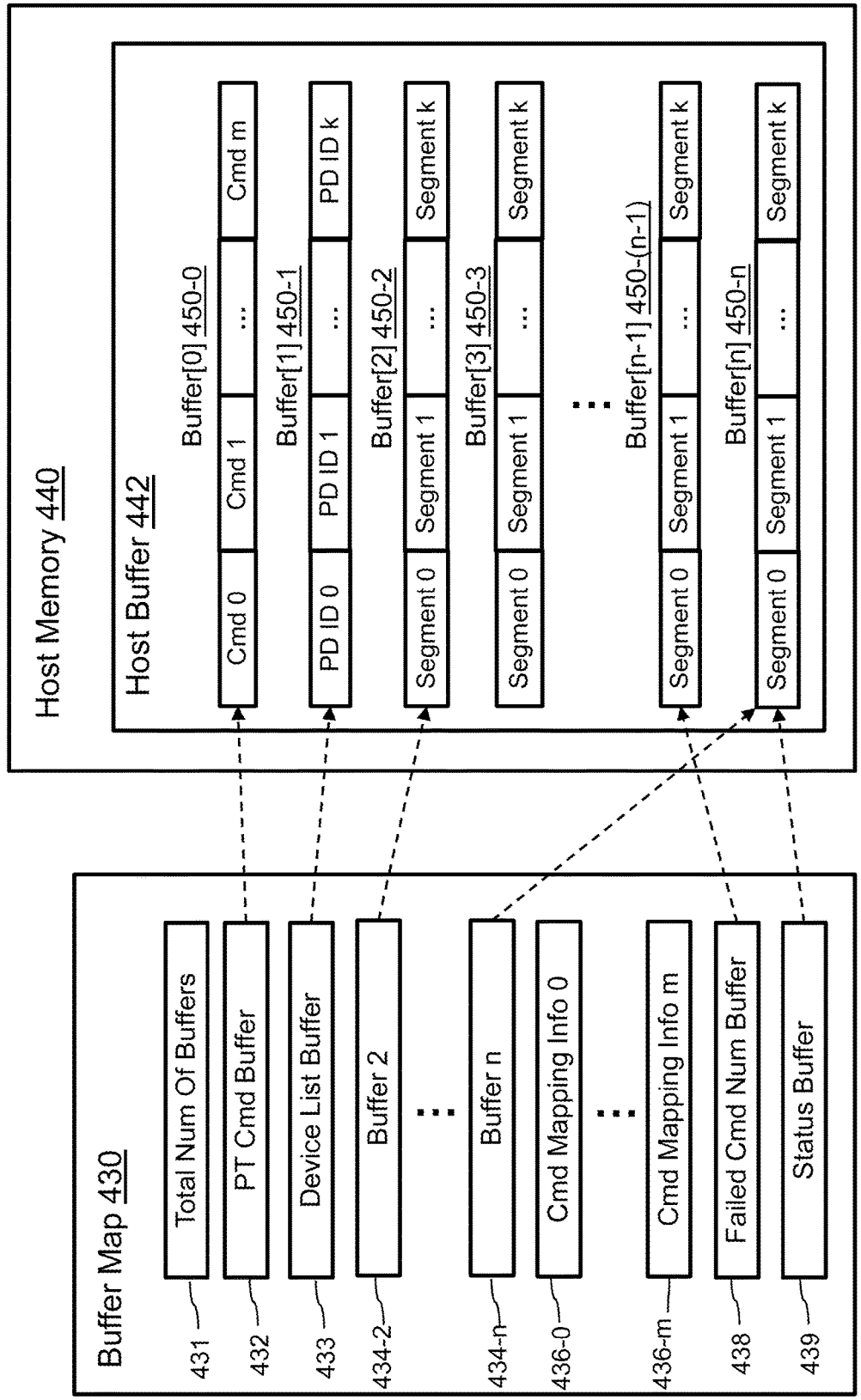
FIG. 4 is a schematic block diagram of a layout of a buffer map and a memory for executing multiple commands in one or more storage devices, in accordance with an embodiment.

FIG. 4 is a schematic block diagram of a layout 400 of a buffer map 430 and a host memory 440 for executing multiple commands in one or more storage devices, in accordance with an embodiment. Referring to FIG. 4, a plurality of buffers 450 of a host buffer 442 (buffer [0] 450-0, buffer [1] 450-1, . . . , buffer [n] 450-n) may be carved out from a host memory 440. The (n+1) number of buffers may have respective buffer numbers (e.g., 0, 1, 2, . . . , n). Each buffer may be divided into a plurality of segments (or sub-buffers). For example, buffer [0] has m segments where m is an integer greater than or equal to 1. In some embodiments, the number m corresponds to the number of commands embedded, included, identified, specified, or contained in a PT command buffer. Each of buffer [1] to buffer [n] has k segments where k is an integer greater than or equal to 1. In some embodiments, the number k corresponds to the number of PDs whose identifiers are embedded, included, identified, specified, or contained in a device list buffer. Each segment may contain common data for all PDs or PD-specific data. The length of each segment (segment length) can be fixed or variable. The plurality of buffers may include a segment length buffer to define or specify a fixed segment length or a variable segment length.

Referring to FIG. 4, the plurality of buffers may include a PT command buffer (e.g., buffer [0] 450-0). In some embodiments, m number of PT request frames may be embedded, included, identified, specified, or contained into the PT command buffer, where m is an integer greater than or equal to 1. Using the PT command buffer 450-0, a system for executing multiple PT commands (e.g., SCSI PT commands) can function like a multiplexer through which multiple SCSI PT commands can be sent from an application to a storage controller simultaneously. For example, each of the SCSI PT frames may be 128 bytes in length. In the PT command buffer 450-0, the SCSI PT frames may be packed one after another in the same order in which the application wants the storage controller to execute the commands. A PT command may have a command number defined by its position in the PT command buffer 450-0. For example, the PT command in the first position in the PT command buffer 450-0 may be command No. 1, the PT command in the second position in the PT command buffer may be command No. 2, and so on. A PT command can have up to 1 input buffer and 1 output buffer. A PT command can be linked to its corresponding input buffer and output buffer by linking the command number of the PT command to the buffer numbers of the corresponding input buffer and output buffer. The buffer map 430 can link (or have information linking) the command number of a PT command to the buffer numbers of an input buffer and an output buffer of the PT command.

The plurality of buffers may include a device list buffer (e.g., buffer [1] 450-1) that lists all the PDs (e.g., listing PD identifiers or references of all the PDs) to which the SCSI PT commands are issued. The device list buffer can define or specify (1) the number of segments (units carrying data for each PD in the device List) in buffers which are not common for all PDs and (2) the order in which the segments for each PD are stored in a buffer. For example, the device list buffer 450-1 specify (1) m number of segments, and (2) the order of PD ID 0, PD ID 1, . . . , PD ID m.

The plurality of buffers may include one or more segment length buffers to define or specify variable length segments (for corresponding PDs) in a buffer. A segment length buffer may contain or specify the length of each segment in a buffer (for the corresponding PD) in the same order as that of PDs listed in the device list buffer 450-1. All elements in the segment length buffer may be the same in length and represent corresponding PDs in the same order as that of PDs listed in the device list buffer 450-1. Like the other buffers, the segment length buffers may have buffer numbers.

The plurality of buffers may include an input buffer to contain input data that is PD-specific. In some embodiments, the input data may be data to be stored, accessed or managed via a PD or any data that can be input to a PD. For example, if n bytes of data have to be sent for each PD and there are m PDs to which commands are issued, the input buffer may have m segments of n bytes each. The m segments may be arranged or positioned in same order as that of PDs listed in the device list buffer 450-1. For example, the input data for the first device listed in the device list buffer (e.g., PD ID 0) may be contained in the first segment of the input buffer (e.g., segment 0), the input data for the second device listed in the device list buffer (e.g., PD ID 1) may be contained in the second segment of the input buffer (e.g., segment 1), and so on. If no input data is used for the commands (e.g., DCMD commands), the input buffer may be omitted or optional. A segment length buffer can be used to specify or define per-PD variable length segments of an input buffer.

Similar to input buffers, the plurality of buffers may include an output buffer which is used to return output data for each PD. For example, if n bytes of data have to be returned for each PD and there are m PDs to which commands are issued, the output buffer may have m segments of n bytes each. The m segments may be arranged or positioned in same order as that of PDs listed in the device list buffer 450-1. If no output data is expected from the PDs for the commands (e.g., DCMD commands), the output buffer may be omitted or optional. A segment length buffer can be used to specify or define per-PD variable length segments of an output buffer.

In some embodiments, the plurality of buffers may include one or more buffers that may transfer both input and output data. In other words, the same buffer can be marked or used for both input and output and such buffers can be indicated as overlapping buffers or bidirectional buffers. After the storage controller issues a command to multiple PDs, data returned from the multiple PDs can be received at different times. Thus, the storage controller may DMA complete buffers into the local memory before initiating an operation (e.g., issuing the next command) on the first PD. For example, the storage controller can use individual DMAs to write data to an output buffer as and when the data are received from individual PDs instead of waiting for the output of all PDs. In some embodiments, each buffer may have a data direction which is one of input (0), output (1), or bidirectional (2). In other words, each buffer can be indicated as an input buffer, an output buffer, or a bidirectional buffer by specifying a data direction of each buffer (in the buffer map 430, for example).

Referring to FIG. 4, the plurality of buffers may include a failed command number buffer (e.g., buffer [n-1] 450-(n-1)) that has an array of bytes or nibbles ordered by the device list order (e.g., the order of PDs listed in the device list buffer 450-1), each byte or nibble indicating the command number that has failed for the corresponding PD. It is possible that one command from the series of commands has failed for a PD, and the storage controller stops issuing the outstanding commands, if any, to the PD. In this case, to indicate to the application which command failed, the storage controller can set the command number in the element corresponding to the PD in the failed command number buffer 450-(n-1). For example, if the second command (e.g., command 1) fails for a PD that is listed in the third element of the device list buffer (e.g., PD ID 2), the storage controller can set the corresponding element for the PD (i.e., segment 2 of the failed command number buffer 450-(n-1)) to the corresponding command number (i.e., 1). If all the commands were successful, all the elements of the failed command number buffer 450-(n-1) may be set to a value of 0. If only one SCSI PT command is embedded, included, identified, specified, or contained, the failed command number buffer 450-(n-1) may be omitted or optional.

In some embodiments, the plurality of buffers may include a status buffer (e.g., buffer [n] 450-n) to indicate a status (e.g., execution status) of a command. The status of the command may indicate failure reasons or code of a failed command. For example, the status buffer 450-n may have an array of command execution statuses for each PD ordered by the device list order. In some embodiments, the status of the last command executed on each PD may be stored in the status buffer 450-n.

Referring to FIG. 4, the buffer map 430 may contain the total number of buffers 431 used in the current DCMD command (e.g., (n+1) buffers), and buffer access information for accessing each of the plurality of buffers (e.g., buffer access information 432, 433, 434-2, . . . , 434-n, 438, 439). For each buffer, the buffer access information may include a buffer number (e.g., 0, 1, . . . , n corresponding to buffer [0], buffer [1], . . . , buffer [n]), an offset (in the host buffer 442), a length, a segment length, a number of elements (e.g., number of segments), and/or a data direction of that buffer. In some embodiments, a segment length of 0 may indicate a common buffer for all PDs (e.g. the PT command buffer, the device list buffer).

In some embodiments, buffer number 0 may be reserved for a PT command buffer (e.g., buffer [0] 450-0) and buffer number 1 may be reserved for a device list buffer (buffer [1] 450-1). For example, the buffer map 430 may include buffer access information 432 of the PT command buffer 450-0 (e.g., a list of MPI3.0 SCSI PT request frames of 128 bytes each) having buffer number 0 (buffer [0]). The buffer map may include buffer access information 433 of the device list buffer 450-1 (e.g., an array of PD identifiers) having buffer number 1 (buffer [1]). The buffer map 430 may include buffer access information 438 of the failed command number buffer 450-(n-1) having buffer number (n-1). The buffer map 430 may include buffer access information 439 of the status buffer 450-n having buffer number n. The buffer map 430 may include buffer access information 434-2 . . . , 434-n of buffer [2], . . . buffer [n], respectively.

In some embodiments, the buffer map 430 may contain mapping information. For example, the buffer map 430 may specify mapping between a command number (of a command) and a buffer number of an input buffer (corresponding to the command). The buffer map may specify mapping between a command number (of a command) and a buffer number of an output buffer (corresponding to the command). For example, the buffer map 430 may contain command mapping information 436-0, . . . , 436-m for command 0, . . . , command m, each command mapping information indicating (1) a buffer number of an input buffer corresponding to the respective command and (2) a buffer number of an output buffer corresponding to the respective command.

In some embodiments, the buffer map 430 may contain information of one or more segment length buffers, for example, buffer number and usage of each segment length buffer. For example, if a segment length buffer is used for a particular buffer, the buffer access information of the particular buffer may include (1) a bit indicating that a segment length buffer is used, and (2) a buffer number of the segment length buffer to be used.

Figure 5:
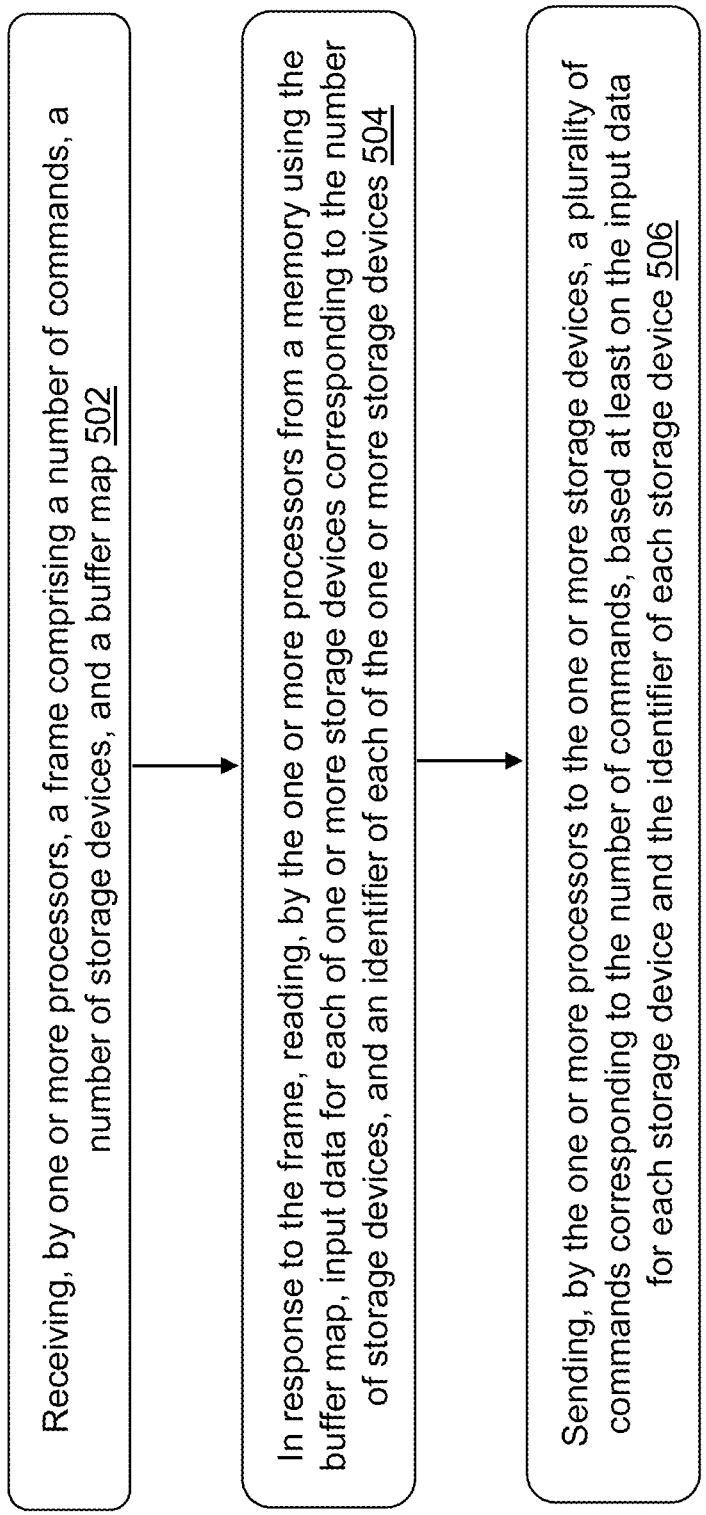
FIG. 5 is a flow diagram showing a process for executing multiple commands in one or more storage devices, in accordance with an embodiment.

FIG. 5 is a flow diagram showing a process 500 for executing multiple commands in one or more storage devices, in accordance with an embodiment. In some embodiments, the process 500 is performed by one or more processors (e.g. processors of host 110, storage controller 130, or PDs 150). In other embodiments, the process 500 is performed by other entities. In some embodiments, the process 500 includes more, fewer, or different steps than shown in FIG. 5.

At step 502, the one or more processors may receive a frame (e.g., request frame 310) comprising a number of commands (e.g., number of commands 327), a number of storage devices (e.g., number of PDs 328), and a buffer map (e.g., buffer map 330, 430).

At step 504, in response to the frame, the one or more processors may read, using the buffer map and from a memory (e.g., host memory 340, 440), (1) input data for each of one or more storage devices corresponding to the number of storage devices 328 and (2) an identifier of each of the one or more storage devices (e.g., PD ID 0, . . . , PD ID k specified in device list buffer 450 [1]). In some embodiments, the one or more storage devices (e.g. PD 0, . . . , PD k) may form a RAID device.

In some embodiments, the memory may include a plurality of buffers (e.g., buffer [0], . . . , buffer [n]), and the buffer map 330, 430 may identify a location (e.g., offset in the host buffer 442) and a length of each of the plurality of buffers. A plurality of commands (e.g., command 0, . . . , command m) may be stored in a first buffer of the plurality of buffers of the memory (PT command buffer 450 [0]) in an execution order. In some embodiments, the location may indicate an address or offset in the memory or any position information locating the buffers in the memory (e.g., a memory address containing an address or offset of the buffers). In some embodiments, the length may indicate any number of bits, bytes, or kilobytes, etc. In some embodiments, the identifiers of the one or more storage devices (e.g., PD ID 0, . . . , PD ID k) may be stored in a second buffer of the plurality of buffers (e.g., device list buffer 450 [1]). The input data for the one or more storage devices may be stored in a third buffer of the plurality of buffers (e.g., input buffer). In some embodiments, the order in which the identifiers of the one or more storage devices are stored in the second buffer (e.g., in the device list order) may be the same as the order in which the input data for the one or more storage devices are stored in the third buffer (e.g., in the device list order).

At step 506, the one or more processors may send, to the one or more storage devices, a plurality of commands corresponding to the number of commands, based at least on the input data for each storage device and the identifier of each storage device. In some embodiments, the plurality of commands may be SCSI passthrough commands and may be sent as frames according to an MPI.

The one or more processors may read, from the first buffer (e.g., PT command buffer 450-0), the plurality of commands (e.g., command 0, . . . , command m) and send, to the one or more storage devices (e.g., PD 0, . . . , PD k), the plurality of commands in the execution order (e.g., the order of command 0, . . . , command m). In some embodiments, in sending the plurality of commands, the one or more processors may send, to the one or more storage devices, a first command of the plurality of commands (e.g., command 0). In response to sending the first command, the one or more processors may send, to the one or more storage devices, a second command of the plurality of commands (e.g., command 1) without waiting for completion of executing the first command (e.g. command 0) on the one or more storage devices (e.g., PD 0, PD 1, . . . , PD k). In some embodiments, the order in which the commands are embedded, in the PT command buffer may be different from the order in which the commands are sent and executed. For example, when the plurality of commands are embedded in the order of command 0, command 1, . . . , command m, the plurality of commands may be sent or executed in the order of command 1, command, 4, command 0, command m, and so on, for example.

The term "coupled" and variations thereof includes the joining of two members directly or indirectly to one another. The term "communicatively coupled" and variations thereof may include communicatively coupling between two members directly or indirectly. Such communication or communicatively coupling may be achieved by a first member being in direct communication with or directly coupled to a second member, or achieved with additional members that may intervene between the first and second members, such that the first member is in indirect communication with or indirectly coupled to the second member via the additional members . . .

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

It should be noted that certain passages of this disclosure can reference terms such as "first" and "second" in connection with subsets of buffers, hosts, and devices, for purposes of identifying or differentiating one from another or from others. These terms are not intended to merely relate entities (e.g., a first device and a second device) temporally or according to a sequence, although in some cases, these entities can include such a relationship. Nor do these terms limit the number of possible entities that can operate within a system or environment. It should be understood that the systems described above can provide multiple ones of any or each of those components and these components can be provided on either a standalone machine or, in some embodiments, on multiple machines in a distributed system. In addition, the systems and methods described above can be provided as one or more computer-readable programs or executable instructions embodied on or in one or more articles of manufacture, e.g., a floppy disk, a hard disk, a CD-ROM, a flash memory card, a PROM, a RAM, a ROM, or a magnetic tape. The programs can be implemented in any programming language, such as LISP, PERL, C, C++, C#, or in any byte code language such as JAVA. The software programs or executable instructions can be stored on or in one or more articles of manufacture as object code.

While the foregoing written description of the methods and systems enables one of ordinary skill to make and use embodiments thereof, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

What is claimed is:

1. A system comprising:
one or more processors configured to:
receive a frame comprising a quantity of commands, a quantity of storage devices, and a buffer map;
in response to the frame, read, using the buffer map and from a memory, (1) input data for each of one or more storage devices corresponding to the quantity of storage devices and (2) an identifier of each of the one or more storage devices; and
send, to the one or more storage devices, a plurality of commands corresponding to the quantity of commands, based at least on the input data for each storage device and the identifier of each storage device.

2. The system of claim 1, wherein
the memory includes a plurality of buffers, and
the buffer map identifies a location and a length of each of the plurality of buffers.

3. The system of claim 2, wherein
the plurality of commands are stored in a first buffer of the plurality of buffers in an execution order, and
the one or more processors are configured to
read, from the first buffer, the plurality of commands and send, to the one or more storage devices, the plurality of commands in the execution order.

4. The system of claim 2, wherein
the identifiers of the one or more storage devices are stored in a second buffer of the plurality of buffers, and
the input data for the one or more storage devices are stored in a third buffer of the plurality of buffers.

5. The system of claim 1, wherein in sending the plurality of commands, the one or more processors are configured to:
send, to the one or more storage devices, a first command of the plurality of commands; and
in response to sending the first command, send, to the one or more storage devices, a second command of the plurality of commands without waiting for completion of executing the first command on the one or more storage devices.

6. The system of claim 1, wherein
the one or more storage devices form a redundant array of independent disks (RAID) device.

7. The system of claim 1, wherein
the plurality of commands are small computer system interface (SCSI) passthrough commands and are sent as frames according to a message passing interface (MPI).

8. A device comprising:
a memory; and
a controller coupled to a plurality of storage devices, wherein
the controller is configured to
- receive a frame comprising a quantity of commands, a quantity of storage devices among the plurality of storage devices, and a buffer map,
- in response to the frame, read, using the buffer map and from the memory, (1) input data for each of one or more storage devices corresponding to the quantity of storage devices and (2) an identifier of each of the one or more storage devices, and
- send, to the one or more storage devices, a plurality of commands corresponding to the quantity of commands, based at least on the input data for each storage device and the identifier of each storage device.

9. The device of claim 8, wherein
the memory includes a plurality of buffers, and
the buffer map identifies a location and a length of each of the plurality of buffers.

10. The device of claim 9, wherein
the plurality of commands are stored in a first buffer of the plurality of buffers in an execution order, and
the controller is configured to
read, from the first buffer, the plurality of commands and send, to the one or more storage devices, the plurality of commands in the execution order.

11. The device of claim 9, wherein
the identifiers of the one or more storage devices are stored in a second buffer of the plurality of buffers, and
the input data for the one or more storage devices are stored in a third buffer of the plurality of buffers.

12. The device of claim 8, wherein in sending the plurality of commands, the controller is configured to:
send, to the one or more storage devices, a first command of the plurality of commands; and
in response to sending the first command, send, to the one or more storage devices, a second command of the plurality of commands without waiting for completion of executing the first command on the one or more storage devices.

13. The device of claim 8, wherein
the one or more storage devices form a redundant array of independent disks (RAID) device.

14. The device of claim 8, wherein
the plurality of commands are small computer system interface (SCSI) passthrough commands and are sent as frames according to a message passing interface (MPI).

15. A method comprising:
receiving, by one or more processors, a frame comprising a quantity of commands, a quantity of storage devices, and a buffer map;
in response to the frame, reading, by the one or more processors using the buffer map and from a memory, (1) input data for each of one or more storage devices corresponding to the quantity of storage devices and (2) an identifier of each of the one or more storage devices; and
sending, by the one or more processors to the one or more storage devices, a plurality of commands corresponding to the quantity of commands, based at least on the input data for each storage device and the identifier of each storage device.

16. The method of claim 15, wherein
the memory includes a plurality of buffers, and
the buffer map identifies a location and a length of each of the plurality of buffers.

17. The method of claim 16, wherein
the plurality of commands are stored in a first buffer of the plurality of buffers in an execution order, and
the method comprises:
reading, from the first buffer, the plurality of commands and sending, to the one or more storage devices, the plurality of commands in the execution order.

18. The method of claim 16, wherein
the identifiers of the one or more storage devices are stored in a second buffer of the plurality of buffers, and
the input data for the one or more storage devices are stored in a third buffer of the plurality of buffers.

19. The method of claim 15, wherein sending the plurality of commands comprises:
sending, to the one or more storage devices, a first command of the plurality of commands; and
in response to sending the first command, sending, to the one or more storage devices, a second command of the plurality of commands without waiting for completion of executing the first command on the one or more storage devices.

20. The method of claim 15, wherein
the one or more storage devices form a redundant array of independent disks (RAID) device.

* * * * *